United States Patent
Ueda et al.

[19]

[11] Patent Number: 6,117,213
[45] Date of Patent: Sep. 12, 2000

[54] PARTICLE TRAP APPARATUS AND METHODS

[75] Inventors: Tetsuzo Ueda, Menlo Park; Glenn S. Solomon, Redwood City; David J. Miller, Belmont, all of Calif.

[73] Assignees: CBL Technologies, Inc., Redwood City, Calif.; Matsushita Electronics Corporation, Osaka, Japan

[21] Appl. No.: 09/307,292

[22] Filed: May 7, 1999

[51] Int. Cl.[7] ................................................. B01D 46/00
[52] U.S. Cl. .......................... 95/273; 55/385.1; 55/490; 55/490.1; 118/715; 156/345; 438/905; 95/283
[58] Field of Search .................... 95/273, 283; 55/385.1, 55/490.1, 490.2, 490; 156/345; 118/715; 438/905

[56] References Cited

U.S. PATENT DOCUMENTS

| | | | |
|---|---|---|---|
| 4,252,545 | 2/1981 | Haterkorn | 95/273 |
| 4,910,042 | 3/1990 | Hokynar | 118/715 |
| 5,443,644 | 8/1995 | Ozawa | 118/715 |
| 5,489,446 | 2/1996 | Matsumoto | 118/715 |
| 5,536,321 | 7/1996 | Olsen et al. | 118/715 |
| 5,571,333 | 11/1996 | Kanaya | 118/715 |
| 5,584,963 | 12/1996 | Takahashi | 438/905 |
| 5,607,511 | 3/1997 | Meyerson | 118/715 |
| 5,788,747 | 8/1998 | Horiuchi et al. | 55/385.1 |
| 5,819,683 | 10/1998 | Ikeda et al. | 118/715 |
| 5,871,813 | 2/1999 | Pham | 156/345 |
| 5,904,757 | 5/1999 | Hayashi et al. | 55/385.1 |
| 5,914,000 | 6/1999 | Takahashi | 156/345 |
| 5,928,426 | 7/1999 | Aitchison | 55/385.1 |
| 6,015,463 | 1/2000 | Cox | 118/715 |

Primary Examiner—Duane S. Smith
Attorney, Agent, or Firm—Lumen Intellectual Property Services

[57] ABSTRACT

A method for removing particulate matter from an exhaust stream, in which the exhaust stream is passed through a particle trap assembly. The trap assembly includes a particle trap having a trap inlet, a filter region located downstream from the trap inlet, and an upstream portion located upstream from the filter region. The cross-sectional area of the upstream portion is preferably at least as great as the cross-sectional area of the filter region. The particle trap may be operably coupled directly to a source of an exhaust stream via a connector unit. The trap assembly may include a heating unit for heating at least a portion of the trap assembly, and a bellows-like connector unit.

26 Claims, 7 Drawing Sheets

PARTICLE TRAP APPARATUS AND METHODS

BACKGROUND OF THE INVENTION

1. Field of the Invention

The present invention relates to filtering of an exhaust stream. The invention also relates to the removal of particulate matter from an exhaust stream. The invention further relates to a wide bore particle trap assembly. The invention still further relates to a method for removing particulate materials from reactor exhaust streams.

2. Background of the Related Art

Nitrides of gallium, indium, and aluminum, and their alloys (III-V nitrides) show much promise in fabrication of a number of light emitting devices. For example, gallium nitride (GaN) is currently used in the manufacture of blue light emitting diodes, semiconductor lasers, and other optoelectronic devices. III-V nitrides may be prepared by techniques including metal organic vapor deposition (MOCVD) and hydride vapor phase deposition (HVPE). A currently preferred method for growth of III-V nitride layers is HVPE. Using gallium nitride as an example, reagent gases for HVPE are ammonia and GaCl. The ammonia is delivered from a standard gas source, while the GaCl is prepared by passing HCl over liquid gallium. Residual, un-reacted HCl or by product HCl, henceforth also referred to a free HCl, also enters the HVPE reactor, and reacts with the ammonia to form ammonium chloride as a byproduct. Ammonium chloride is a white powder that may condense inside the reactor and which can easily block the exhaust line of a HVPE system. If such blockage occurs, the HVPE system must be shut down and epitaxial growth is aborted, leading to decreased productivity, as well as added operating and maintenance costs. Further, such blockage events can lead to catastrophic failure and damage of the reactor tube.

A particle trap is typically used in the HVPE exhaust line to mitigate against blockage of the system. However, due to the relatively large quantities of ammonium chloride involved in carrying out HVPE, prior art particle traps are themselves prone to frequent saturation and blockage. The present invention addresses problems associated with the removal of particulate matter from the exhaust stream of a reactor, such as a HVPE reactor, as will be described fully hereinbelow.

SUMMARY OF THE INVENTION

In view of the above, it is an object of the present invention to provide an improved particle trap assembly.

One feature of the invention is that it provides a trap assembly which is arranged linearly with the source of an exhaust stream. Another feature of the invention is that it provides a particle trap including a bellows-like connector unit. Another feature of the invention is that it provides a method for removing particulate matter from an exhaust stream using a trap assembly having a heating unit. Another feature of the invention is that it provides a system including a linear reactor coupled linearly to a trap assembly.

One advantage of the invention is that it provides a reliable and efficient particle trap assembly. Another advantage of the invention is that it provides a trap assembly including a filter region and a connector unit, wherein the connector unit is at least as wide as the filter region. Another advantage of the invention is that the trap assembly is coupled linearly with the reactor. Another advantage of the invention is that the trap assembly is coupled directly to a reactor outlet.

These and other objects, advantages and features are accomplished by the provision of a particle removal system, including: a reactor having a reactor inlet and a reactor outlet; and a trap assembly including a filter region, an upstream portion and a downstream portion, the upstream portion having a cross-sectional area at least 20% the cross-sectional area of the filter region. The trap assembly further includes a particle trap and a connector unit, and the trap assembly is operably coupled directly to the reactor outlet via the connector unit.

These and other objects, advantages and features are accomplished by the provision of a method for operating a HVPE system, including the steps of: a) providing a reactor having a reactor inlet and a reactor outlet; b) coupling a trap assembly to the reactor outlet; and c) passing an exhaust stream from the reactor through the trap assembly, wherein the trap assembly includes a filter region, an upstream portion and a downstream portion, and the upstream portion has a cross-sectional area at least approximately the same as the cross-sectional area of the filter region.

These and other objects, advantages and features are accomplished by the provision of particle trap assembly for removal of particles from an exhaust stream, including: a connector unit, a filter region, and an upstream portion, the upstream portion located upstream from the filter region with respect to the exhaust stream, the upstream portion at least 20% as wide as the filter region; the connector unit having a connector inlet and a connector outlet, the connector inlet upstream from the connector outlet, the connector inlet adapted for operably coupling the connector unit directly to a reactor outlet.

These and other objects, advantages and features of the invention will be set forth in part in the description which follows and in part will become apparent to those having ordinary skill in the art upon examination of the following or may be learned from practice of the invention. The advantages of the invention may be realized and attained as particularly pointed out in the appended claims.

DETAILED DESCRIPTION OF THE PREFERRED EMBODIMENTS

For purposes of illustration, the invention will be described primarily in relation to removal of particulate matter from the exhaust stream of a reactor of a HVPE system. However, it is to be understood that the invention is also applicable to the removal of particulate matter from the exhaust stream of other types of systems and reactors.

Figure 1A:
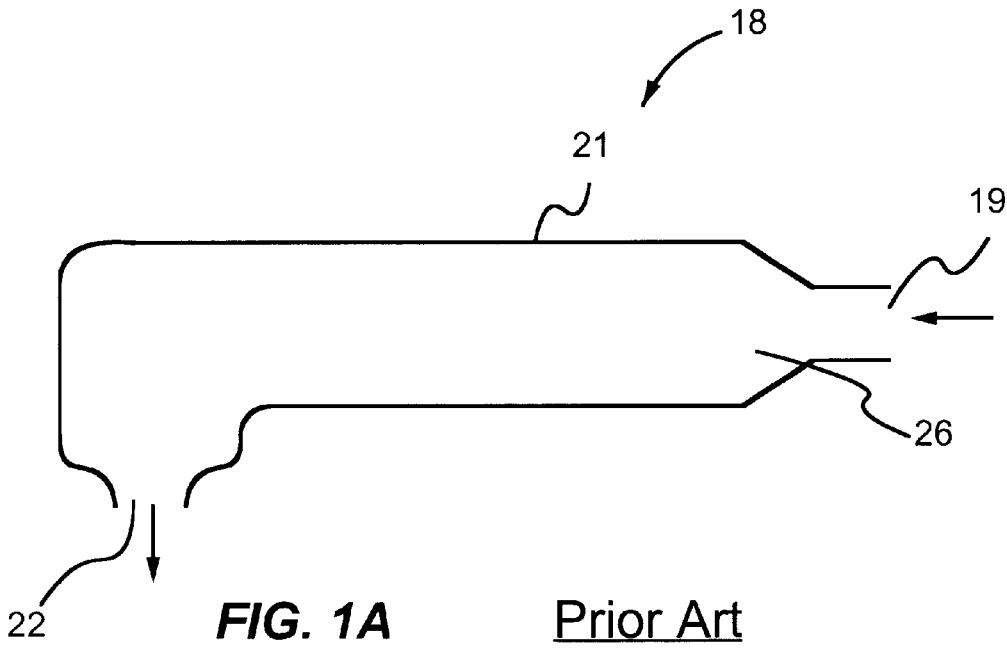
FIG. 1A schematically represents a HVPE system, according to the prior art.

Referring now to the drawings, FIG. 1A schematically represents a HVPE system 18 of the type well known in the art. Briefly, system 18 includes a growth tube or reactor 21, having inlet 19 and outlet 22, and a reaction assembly 26. System 18 may be contained entirely within a furnace (not shown). Epitaxial deposition proceeds by the vapor-phase reaction of reagent gases which are introduced into reactor 21. For example, a reagent gas, such as gallium chloride, indium chloride, or aluminum chloride may be produced in reaction assembly 26; while ammonia may be introduced into growth tube 21 through reactor inlet 19. Reagent gas, e.g. GaCl, may be formed in reaction assembly 26 by passing HCl over liquid metal (e.g., Ga, In and Al). The direction of gas flow is indicated by the arrows. Reagent gases (e.g., GaCl, InCl and AlCl) react with the ammonia within growth tube 21 to form the respective nitride, GaN, InN, or AlN. The ammonia also reacts with free HCl to form ammonium chloride, as a byproduct, in the form of a white crystalline powder. Thus, the exhaust stream emanating from outlet 22, includes particulate ammonium chloride byproduct.

Figure 1B:
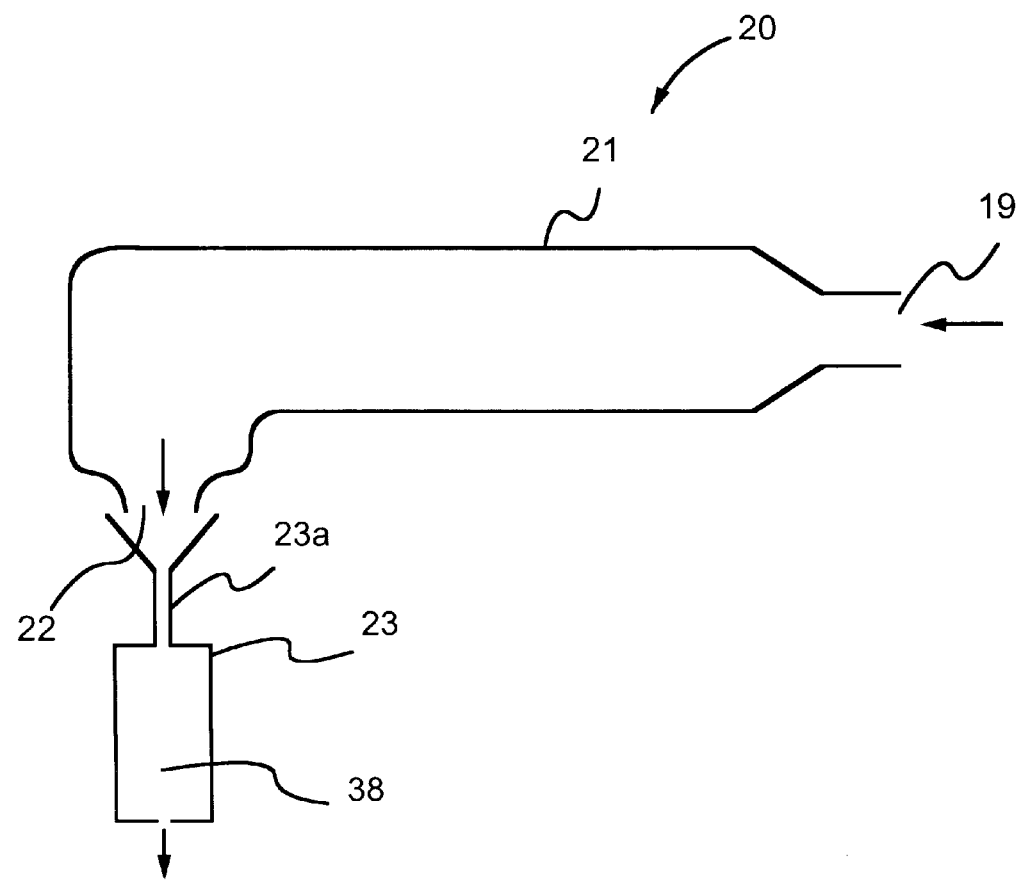
FIG. 1B schematically represents a HVPE/particle trap system, according to the prior art.

FIG. 1B schematically represents a HVPE/particle trap system 20, according to the prior art. As shown in FIG. 1B, a trap assembly 23 is coupled to outlet 22 to remove particulate ammonium chloride from the exhaust stream. Trap assembly 23 includes a filter 38. Typically trap assembly 23 of the prior art is connected to outlet 22 via relatively narrow tubing 23a. As a result, flow of the exhaust stream is impeded, and blockage of tubing 23a and/or filter 38 with particulate matter frequently ensues. In an attempt to prevent unwanted deposition in the narrow tube 23a, the narrow tube 23a is frequently heated.

Figure 2A:
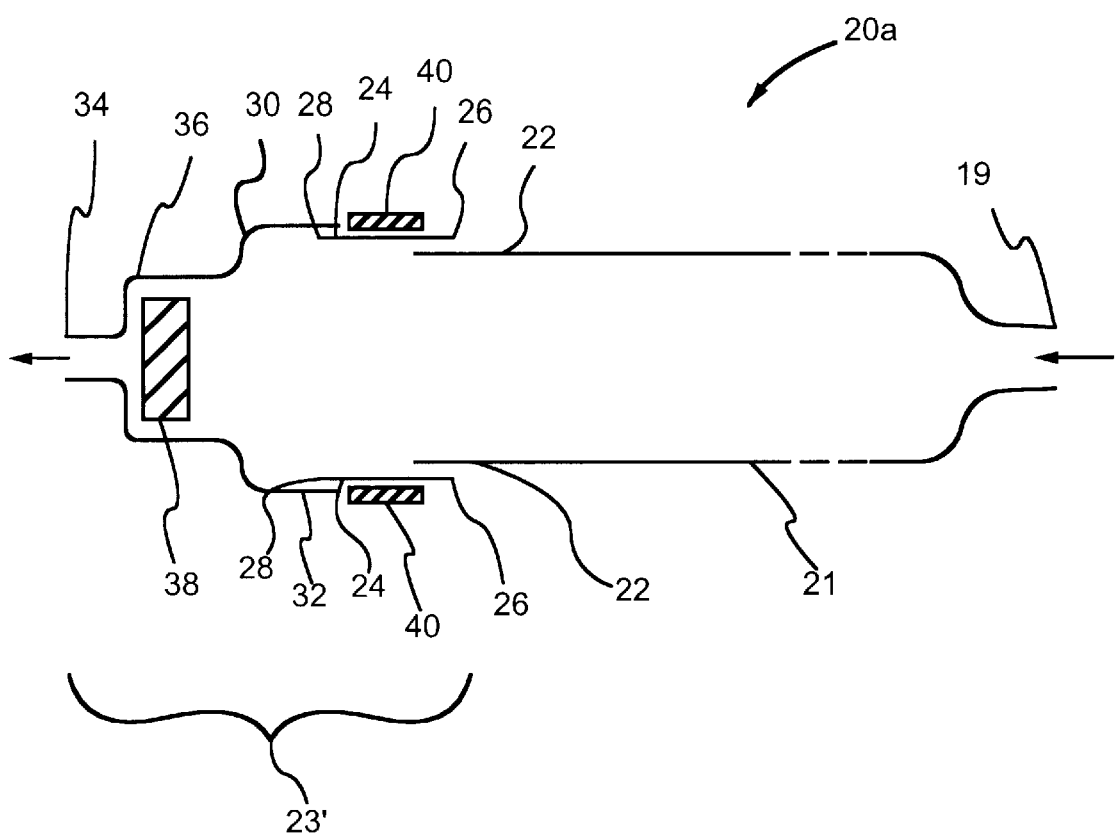
FIGS. 2A, 2B, and 2C each schematically represent a HVPE/particle trap system, according to various embodiments of the invention.

FIG. 2A schematically represents a HVPE/particle trap system 20a, according to one embodiment of the instant invention. System 20a includes reactor 21 coupled directly to a trap assembly 23'. Reactor 21 includes reactor inlet 19 and reactor outlet 22. Trap assembly 23' includes a connector unit 24 and particle trap 30. Trap assembly 23' is preferably at least substantially linear; more preferably particle trap 30 and connector unit 24 are arranged coaxially. Connector unit 24 includes a connector inlet 26 and a connector outlet 28. Trap assembly 23' is operably connected directly to reactor outlet 22 via connector unit 24.

According to a preferred embodiment of the invention, reactor 21 is at least substantially linear, such that inlet 19 and outlet 22 are substantially in alignment. Furthermore, according to the instant invention, trap assembly 23' is preferably connected to reactor 21 in a linear arrangement. More preferably, reactor 21 and trap assembly 23' are arranged at least substantially coaxially.

Particle trap 30 includes a trap inlet 32 and trap outlet 34. Particle trap 30 is operably coupled to connector unit 24 at trap inlet 32 and connector outlet 28. Particle trap 30 further includes a filter region 36. The direction of the exhaust stream is indicated by the arrows.

Figure 3:
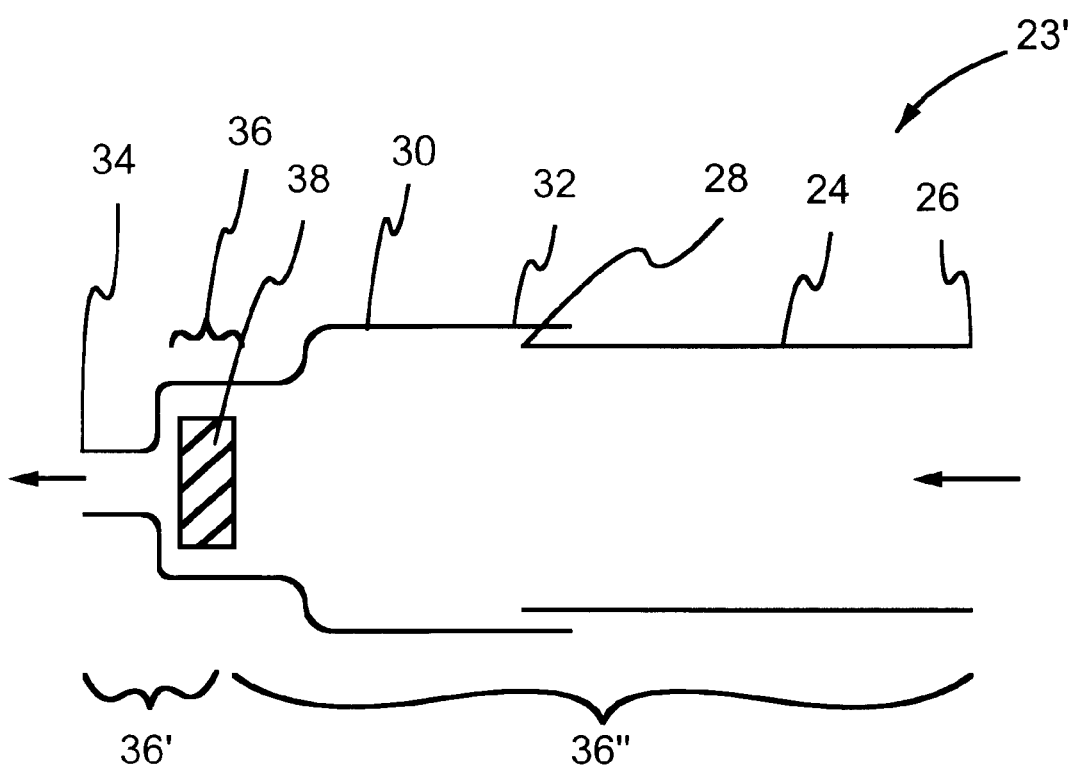
FIG. 3 schematically represents a trap assembly, showing a filter region, an upstream portion, and a downstream portion, according to the invention.

Perhaps as best seen in FIG. 3, trap outlet 34 is located downstream from filter region 36, while trap inlet 32 and connector unit 24 are located upstream from filter region 36. Those portions of trap assembly 23' downstream from filter region 36 define a downstream portion 36' of assembly 23', while those portions of trap assembly 23' upstream from filter region 36 define an upstream portion 36" of assembly 23'.

According to the invention, it is currently preferred that the cross-sectional area of upstream portion 36" is at least 20% the cross-sectional area of filter region 36. Preferably, all portions of trap assembly 23' located upstream from filter region 36 have a cross-sectional area greater than the cross-sectional area of filter region 36. For example, in the case of a filter region 36 having a cross-sectional area of 1600 $mm^2$, the cross-sectional area of upstream portion 36" is 2000 $mm^2$. By increasing the cross-sectional area of trap assembly 23' upstream from filter region 36, the operation of assembly 23' and system 20a is rendered more reliable and efficient.

According to a currently preferred embodiment, filter region 36 houses at least one filter 38. Materials useful as filters are well known in the art. As an example, filter 38 may include a fibrous or granular material, which may be either natural or synthetic. An exemplary filter material is glass wool.

According to certain embodiments of the invention, trap assembly 23' may include a heating unit 40. Heating unit 40 may serve to raise the temperature of at least a portion of trap assembly 23', e.g., connector unit 24. Heating unit 40 may be in the form of electrical heating tape unit such those well known in the art. Such heating tape units are capable of heating the trap unit 23' to around 200° C. The use of heating unit 40 decreases the amount of deposit collecting on components of trap assembly 23' upstream from filter 38, thereby leading to more reliable and efficient operation of assembly 23' and system 20a.

Figure 2B:
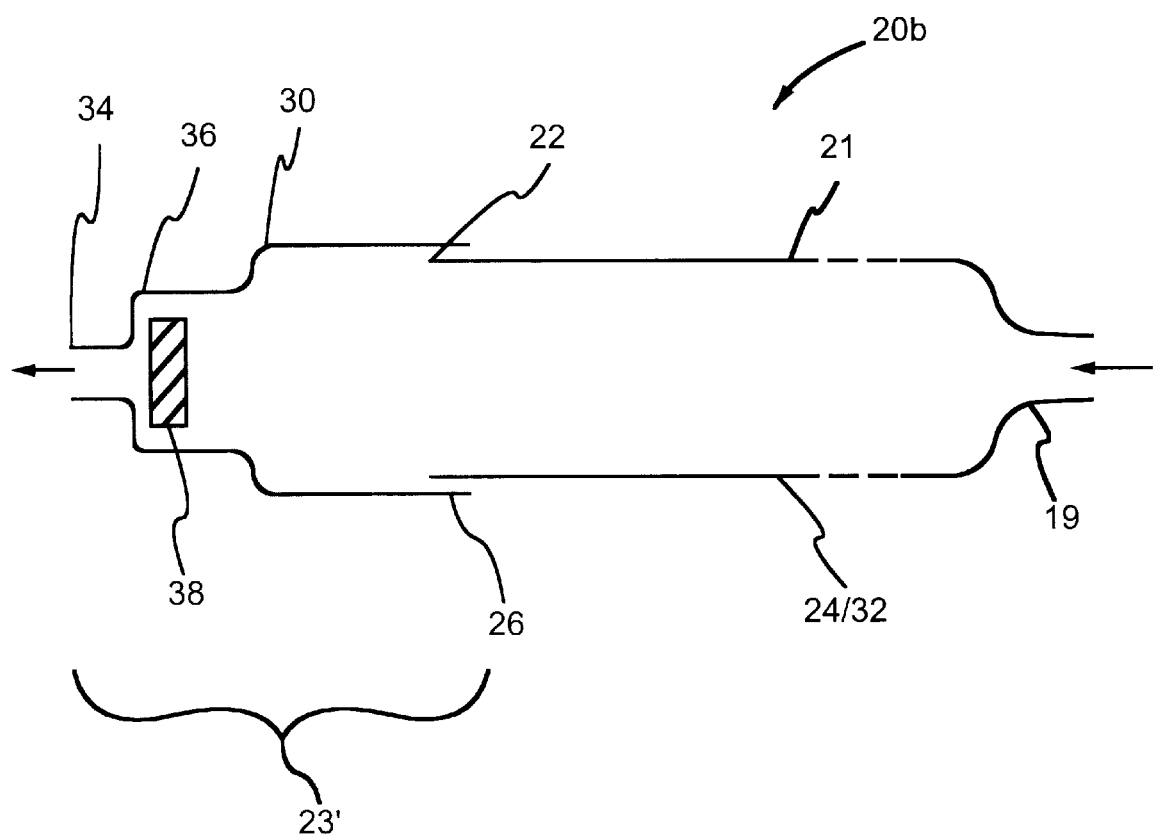

FIG. 2B schematically represents a HVPE/particle trap system 20b, according to another embodiment of the invention. System 20b is similar to system 20a (FIG. 2A). Thus, what has been stated hereinabove with reference to system 20a may be equally applicable to system 20b. However, assembly 23' of system 20b features particle trap 30 having connector unit 24 integral therewith, i.e., connector unit 24 is integrated with particle trap 30 to form a unitary trap assembly 23' which may be conveniently coupled directly to reactor 21.

What has been stated hereinabove with reference to system 20a regarding the relative cross-sectional area of filter region 36 and portions of trap assembly 23' upstream from filter region 36, applies equally to the embodiment of system 20b. Furthermore, the embodiment of system 20b may also include heating unit 40 (FIG. 2A) adapted for heating at least a portion of trap assembly 23'.

Figure 2C:
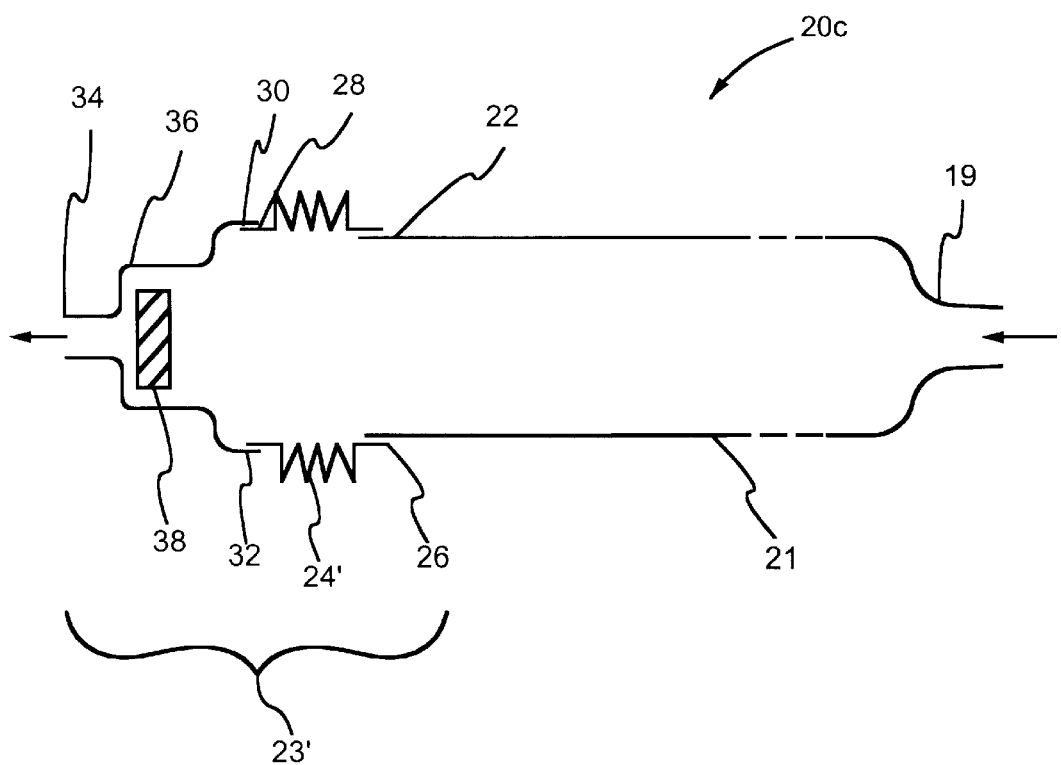

FIG. 2C schematically represents a HVPE/particle trap system 20c, according to another embodiment of the invention. System 20c may share many of the same elements and features as described hereinabove with reference to systems 20a and 20b (FIGS. 2A, 2B). What has been stated hereinabove with reference to system 20a regarding the relative cross-sectional area of filter region 36 and portions of trap assembly 23' upstream from filter region 36, applies equally to the embodiment of system 20c. However, assembly 23' of system 20c includes a connector unit 24' having a bellows-like tube. By bellows-like tube is meant a conduit or similar structure, having a ridged or undulating wall, or other feature(s) which serves to expand the interior surface of the conduit. One advantage of connector unit 24' is that the surface area within the conduit is increased. It has been observed that increased surface area of connector unit 24', having a bellows-like tube, leads to more effective entrapment, or removal, of particulate matter from the exhaust stream. A further advantage associated with connector unit 24' is that the bellows-like tube increases the flexibility of unit 24', such that connection of trap assembly 23' to reactor outlet 22 is facilitated.

Figure 4A:
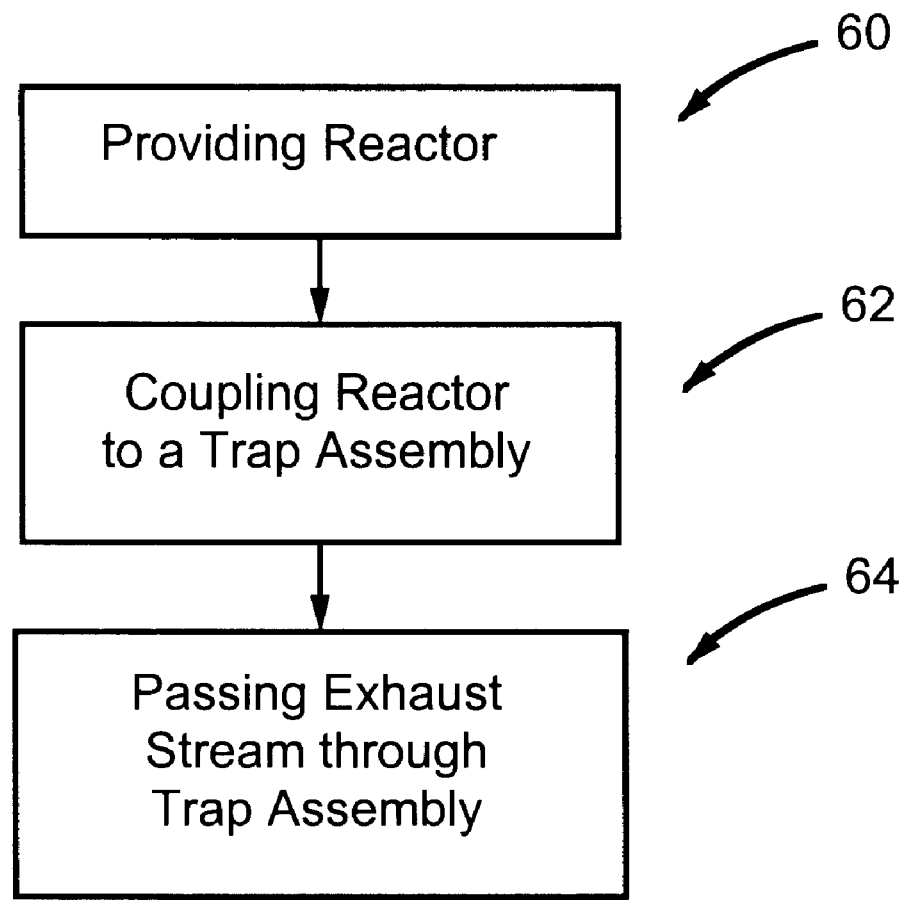
FIG. 4A schematically represents a series of steps involved in a method of removing particulate matter from an exhaust stream, according to one embodiment of the invention.

FIG. 4A schematically represents a series of steps involved in a method of removing particulate matter from an exhaust stream, according to the invention, in which step 60 involves providing a reactor, such as a reactor of a HVPE system (e.g. reactor 21 of system 20a–c, FIGS. 2A–2C). Preferably, the reactor provided in step 60 is linear, having the reactor inlet substantially aligned with the reactor outlet.

Step 62 involves coupling the reactor, directly, to a trap assembly. That is to say, the trap assembly is operably coupled to the reactor without any extraneous tubing or other non-system components. The trap assembly includes a particle trap and a connector unit, wherein the connector may be integral with the particle trap. Preferably, the trap assembly is directly coupled to the reactor outlet via the connector unit, such that the trap assembly is arranged linearly with the reactor. The trap assembly coupled to the reactor may be, e.g., any of the trap assemblies described hereinabove with reference to FIGS. 2A–2C.

The trap assembly includes a filter region located downstream from the connector unit, and an upstream portion (FIG. 3). Preferably, the upstream portion of the trap assembly has a cross-sectional area at least 20% the cross-sectional area of the filter region. More preferably, all portions of the trap assembly located upstream from the filter region have a cross-sectional area at. Alternatively, the upstream portion has a cross-sectional area greater than the cross-sectional area of the filter region least as great as the cross-sectional area of the filter region. According to another embodiment, the trap assembly includes a bellows-like connector unit. Step 64 involves passing the reactor exhaust stream through the trap assembly. Particulate matter is removed from the exhaust stream, primarily in the filter region of the particle trap.

Figure 4B:
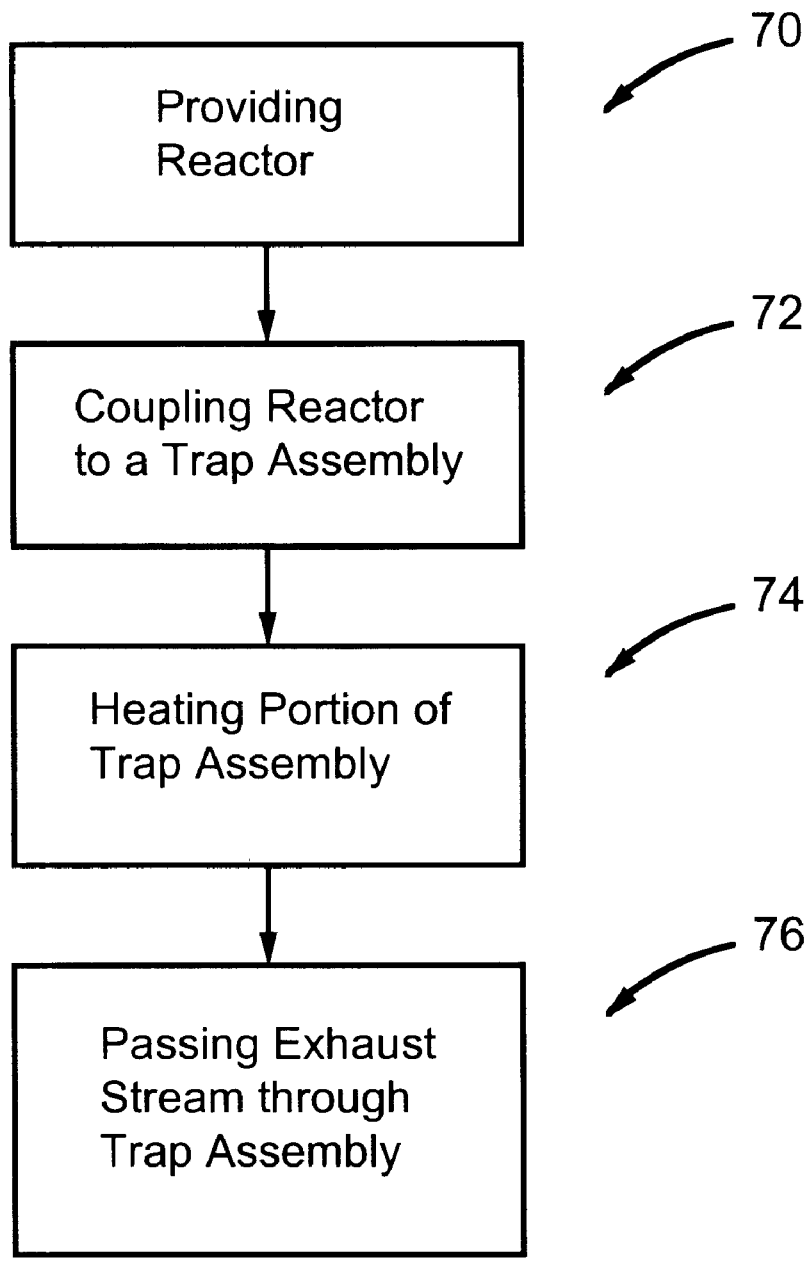
FIG. 4B schematically represents a series of steps involved in a method of removing particulate matter from an exhaust stream, according to another embodiment of the invention.

FIG. 4B schematically represents a series of steps involved in a method of removing particulate matter from an exhaust stream, according to another embodiment of the invention, in which steps 70 and 72 are broadly analogous to steps 60 and 62 described hereinabove (FIG. 4A). However, in step 72 the reactor is directly coupled to a trap assembly having a heating unit. The heating unit is adapted for heating at least a portion of the trap assembly. For example, the heating unit may be used to heat part, or all, of the connector unit. The heating unit may be in the form of a heating tape unit well known and widely used in the field. Step 74 involves heating, by means of the heating unit, at least a portion of the trap assembly. Heating at least a portion of the trap assembly may lead to more efficient removal of particulate matter from the exhaust stream, as well as more reliable operation of the trap assembly. Step 76 is analogous to step 64, hereinabove (FIG. 4A).

For purposes of illustration, the invention has been described primarily in relation to the removal of ammonium chloride particles from the exhaust stream of a HVPE system. However, the invention is also applicable to the removal of other types of particulate matter emanating from reactors other than HVPE reactors.

The foregoing embodiments are merely exemplary and are not to be construed as limiting the present invention. The present teaching may be applied to other types of apparatuses and methods. The description of the present invention is intended to be illustrative, and not to limit the scope of the appended claims. Many alternatives, modifications, and variations will be apparent to those skilled in the art.

What is claimed is:

1. A system, comprising:

a reactor having a reactor inlet and a reactor outlet; and a trap assembly including a filter region, an upstream portion and a downstream portion, said trap assembly operably coupled directly to said reactor outlet, wherein said upstream portion has a cross-sectional area at least 20% of the cross-sectional area of said filter region.

2. The system of claim 1, wherein said upstream portion has a cross-sectional area at least as great as the cross-sectional area of said filter region.

3. The system of claim 1, wherein said upstream portion has a cross-sectional area greater than the cross-sectional area of said filter region.

4. The system of claim 1, wherein said reactor outlet is aligned substantially linearly with said reactor inlet, and said trap assembly is arranged substantially linearly with said reactor.

5. The system of claim 1, wherein said trap assembly further includes a particle trap and a connector unit, said particle trap arranged linearly with said connector unit, said trap assembly coupled directly to said reactor via said connector unit.

6. The system of claim 5, wherein said connector unit is integral with said particle trap.

7. The system of claim 5, wherein said connector unit includes a flexible tube.

8. The system of claim 1, wherein said trap assembly further includes a heating unit, said heating unit adapted for heating at least a portion of said trap assembly.

9. The system of claim 1, wherein said trap assembly further includes a connector unit and a heating unit, said heating unit arranged adjacent to said connector unit.

10. The system of claim 1, wherein said reactor is a HVPE reactor.

11. A method of operating a HVPE system, comprising the steps of:

a) providing a reactor, the reactor having a reactor inlet and a reactor outlet;

b) operably coupling a trap assembly directly to the reactor via the reactor outlet; and c) passing an exhaust stream from the reactor through the trap assembly, wherein the trap assembly includes a filter region, an upstream portion and a downstream portion, and wherein the upstream portion has a cross-sectional area at least as great as the cross-sectional area of the filter region.

12. The method of claim 11, wherein the trap assembly further includes a particle trap and a connector unit, the particle trap and the connector unit arranged coaxially, the connector unit adapted for operably coupling the trap assembly directly to the reactor outlet.

13. The method of claim 11, further comprising the step of:

d) prior to said step c), heating at least a portion of the trap assembly.

14. The method of claim 13, wherein said step d) comprises heating at least a portion of the connector unit.

15. The method of claim 12, wherein the connector unit includes a flexible tube.

16. The method of claim 11, wherein the trap assembly is at least substantially linear, the reactor is at least substantially linear, and the trap assembly is directly coupled linearly with the reactor.

17. A HVPE/trap system, comprising: a HVPE system, and a trap assembly operably coupled directly to said HVPE system, wherein said HVPE system includes a reactor having a reactor outlet, said reactor outlet adapted for passing an exhaust stream from said reactor, said exhaust stream including particulate matter; and wherein said trap assembly is adapted for removing said particulate matter from said exhaust stream, wherein said trap assembly comprises a particle trap having a filter region, said trap assembly operably coupled directly to said HVPE system via said reactor outlet, said filter region downstream from said reactor outlet, and wherein no portion of said trap assembly upstream from said filter region has a cross-sectional area less than 20% the cross-sectional area of said filter region.

18. The system of claim 17, wherein said trap assembly further comprises a connector unit for coupling said trap assembly directly to said reactor outlet, said connector unit including a flexible tube, said flexible tube adapted for increasing the surface area of said connector unit.

19. The system of claim 18, wherein said connector unit is integral with said particle trap.

20. The system of claim 17, further including a heating unit, said heating unit for heating at least a portion of said trap assembly.

21. A particle trap assembly for removal of particles from an exhaust stream, comprising: a connector unit, a filter region, and an upstream portion, said upstream portion located upstream from said filter region with respect to said exhaust stream, said upstream portion having a cross-sectional area at least 20% that of said filter region; said connector unit having a connector inlet and a connector outlet, said connector inlet upstream from said connector outlet, said connector inlet adapted for operably coupling said connector unit directly to a reactor outlet.

22. The assembly of claim 21, further comprising a heating unit, said heating unit adapted for heating at least a portion of said trap assembly.

23. The assembly of claim 22, wherein said heating unit is arranged adjacent to said connector unit.

24. The assembly of claim 21, wherein said connector unit comprises a flexible tube.

25. The assembly of claim 21, further comprising a particle trap, said particle trap comprising said filter region, and said particle trap arranged at least substantially coaxially with said connector unit.

26. The assembly of claim 21, wherein said upstream portion is at least substantially as wide as said filter region.

* * * * *